United States Patent
Yang et al.

(10) Patent No.: US 12,538,169 B2
(45) Date of Patent: Jan. 27, 2026

(54) SYSTEM AND METHOD FOR ACHIEVING ZERO PACKET LOSS IN WIRELESS ROAMING

(71) Applicant: Cisco Technology, Inc., San Jose, CA (US)

(72) Inventors: Qiang Yang, Shanghai (CN); Kathy Xia Ke, Shanghai (CN); Yuping Wang, Shanghai (CN); Jing Wang, Shanghai (CN); Bin Yu, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 319 days.

(21) Appl. No.: 18/365,451

(22) Filed: Aug. 4, 2023

(65) Prior Publication Data
US 2025/0048177 A1      Feb. 6, 2025

(51) Int. Cl.
*H04W 28/04*     (2009.01)
*H04W 28/02*     (2009.01)

(52) U.S. Cl.
CPC ....... *H04W 28/04* (2013.01); *H04W 28/0236* (2013.01)

(58) Field of Classification Search
CPC . H04W 28/04; H04W 28/0236; H04W 48/20; H04W 36/00; H04W 36/087; H04W 36/0016
See application file for complete search history.

(56) References Cited

U.S. PATENT DOCUMENTS

| | | | |
|---|---|---|---|
| 2008/0025271 | A1 | 1/2008 | Sekhar |
| 2013/0148641 | A1 | 6/2013 | Sivaprakasam et al. |
| 2017/0272364 | A1* | 9/2017 | Ishii ............... H04W 36/00695 |
| 2020/0162971 | A1 | 5/2020 | Nie |
| 2021/0105688 | A1 | 4/2021 | Paladugu et al. |
| 2022/0104054 | A1* | 3/2022 | Fu .................... H04W 36/0079 |

OTHER PUBLICATIONS

Kishor Ramachandran, Sampath Rangarajan, John C. Lin, "Make-Before-Break MAC Layer Handoff in 802.11 Wireless Networks," Researchgate.net, Jul. 2006.

* cited by examiner

*Primary Examiner* — Dinh Nguyen
(74) *Attorney, Agent, or Firm* — Baker Botts L.L.P.

(57) ABSTRACT

In one embodiment, a method for achieving zero packet loss in wireless roaming is implemented by a processor of a wireless client device in a system. The wireless client device establishes a first data plane in association with a first radio connected to a first access point and a second data plane in association with a second radio. The first data plane is different from and operates concurrently with the second data plane. The wireless client device determines a second access point by scanning a plurality of operating channels using the second radio. The wireless client device synchronizes the second data plane with a network controller to connect the second radio with the second data plane to the second access point. The wireless client device switches traffic of the first data plane connected to the first access point to the second data plane connected to the second access point.

20 Claims, 4 Drawing Sheets

SYSTEM AND METHOD FOR ACHIEVING ZERO PACKET LOSS IN WIRELESS ROAMING

TECHNICAL FIELD

The present disclosure relates generally to wireless communication, and more particularly, to a system and method for achieving zero packet loss in wireless roaming.

BACKGROUND

Current wireless communication technology may reduce roaming latency in wireless networks. However, a long traffic interruption may still occur during roaming. For example, it may take around 240 ms to complete wireless roaming in multiple channels, such as in an access point (AP) as a workgroup bridge (e.g., WGB-AP) device. It is not acceptable for some mission critical tasks, such as motion control tasks, since a single traffic interruption may cause a failure of an entire system. Currently, more and more applications require solutions to provide fast roaming with seamless network connectivity to support the applications with 802.11 standards deployment.

DESCRIPTION OF EXAMPLE EMBODIMENTS

Overview

Figure 1:
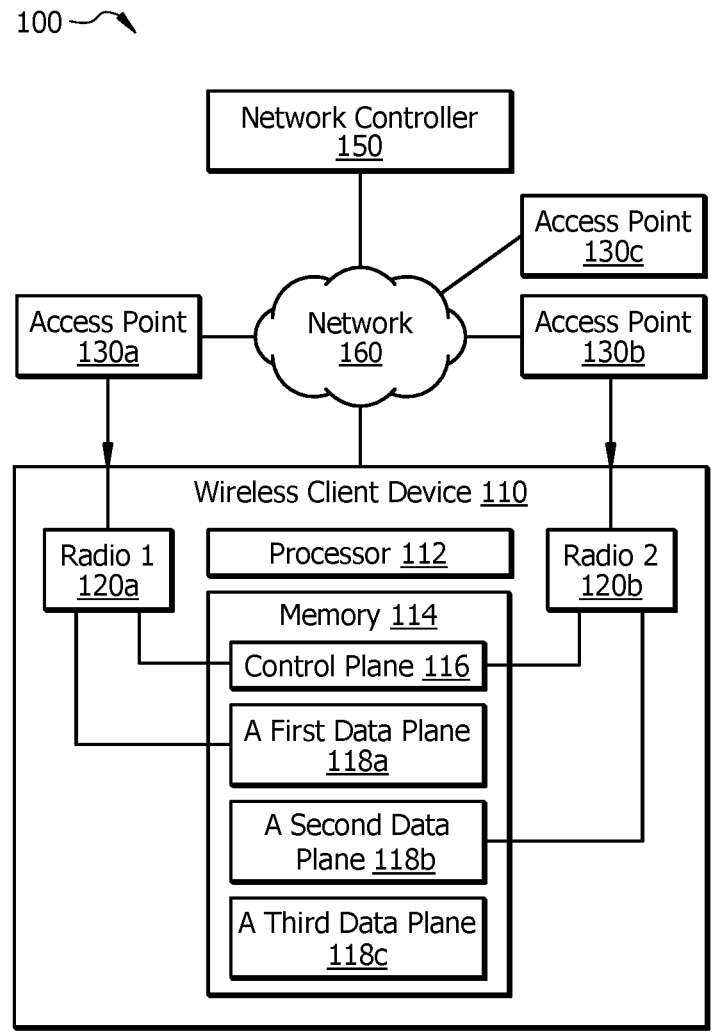
FIG. 1 illustrates a network system for achieving zero packet loss in wireless roaming, according to particular embodiments of the present disclosure.

In particular embodiments, a system for achieving zero packet loss in wireless roaming may include a network controller and a wireless client device in communication with the network controller. The wireless client device may include a memory and a processor communicatively coupled to the memory. The processor of the wireless client device may be configured to establish a first data plane in association with a first radio connected to a first access point; and establish a second data plane in association with a second radio. The first data plane is different from the second data plane and operates concurrently with the second data plane. The processor of the wireless client device may be configured to determine a second access point by scanning a plurality of operating channels using the second radio; synchronize, through a control plane, the second data plane with the network controller to connect the second radio with the second data plane to the second access point; and switch, through the control plane, traffic of the first data plane connected to the first access point to the second data plane connected to the second access point. The control plane is configured to operate with the first radio and the second radio to control roaming of the wireless client device and data transmission between the first data plane and the second data plane.

In particular embodiments, the processor of the wireless client device is further configured to communicate to the network controller an authentication frame and an association frame through the second data plane to request roaming from the first access point to the second access point. The network controller is configured to communicate a first signaling message through the control plane to the second access point to request installing configuration information of the wireless client device; and receive a second signaling message from the second access point indicating that the configuration information of the wireless client device is installed.

In particular embodiments, the processor of the wireless client device is further configured to receive a third signaling message from the network controller through the control plane. The third signaling message indicates an authorization for the wireless client device to roam from the first access point to the second access point.

In particular embodiments, the processor of the wireless client device is further configured to delete, through the control plane, the first data plane in response to switching the traffic of the first data plane connected to the first access point to the second data plane connected to the second access point.

In particular embodiments, a method for achieving zero packet loss in wireless roaming may include establishing a first data plane in association with a first radio connected to a first access point; and establishing a second data plane in association with a second radio. The first data plane is different from the second data plane and operates concurrently with the second data plane. The method further includes determining a second access point by scanning a plurality of operating channels using the second radio; synchronizing, through a control plane, the second data plane with the network controller to connect the second radio with the second data plane to the second access point; and switching, through the control plane, traffic of the first data plane connected to the first access point to the second data plane connected to the second access point.

In particular embodiments, one or more computer-readable non-transitory storage media stores instructions that when executed by a processor cause the processor to establish a first data plane in association with a first radio connected to a first access point; and establish a second data plane in association with a second radio. The first data plane is different from the second data plane and operates concurrently with the second data plane. The instructions when executed by the processor further cause the processor to: determine a second access point by scanning a plurality of operating channels using the second radio; synchronize, through a control plane, the second data plane with the network controller to connect the second radio with the second data plane to the second access point; and switch, through the control plane, traffic of the first data plane connected to the first access point to the second data plane connected to the second access point.

Technical advantages of certain embodiments of this disclosure may include one or more of the following. Certain systems and methods described herein may prevent a communication interruption and packet loss caused by authentication and association processes for performing a roaming using Wi-Fi systems or other wireless systems. In particular embodiments, a wireless client device may perform wireless roaming and data transmission with a single control plane operating with two data planes associated with respective wireless access points. A wireless client device may achieve zero packet loss by configuring two radios of the wireless client device to share a media access control (MAC) address and implementing a data path ready synchronization mechanism. The data path ready synchronization mechanism may be implemented through a control plane to synchronize the second data plane with a network controller to connect the second radio with the second data plane to the second access point to complete the roaming. After the roaming from the first access point to the second access point is completed and a second data plane associated with the second radio is connected to the second access point, the traffic of the first data plane associated with the first access point may be switched to the second data plane associated with the second access point. In particular embodiments, the data plane switch is implemented only after the roaming from the first access point to the second access point is completed and the second data plane associated with the second access point is ready for receiving traffic from the first data plane. In this way, a control plane of the wireless client device may operate with the first data plane associated with the first radio for the data transmission with the first access point. Simultaneously, the control plane of the wireless client device may operate with the second data plane to perform a roaming to the second access point and associate the second data plane with the second access point for receiving the traffic of the first data plane. Thus, the data transmission with the first data plane is not interrupted in the roaming. The traffic of the first data plane associated with the first radio connected to the first access point may be switched to the second data plane associated with the second radio connected to the second access point without packet loss. The data path ready synchronization mechanism may be used for a wireless client device, which may operate with multiple radios such as 2.4 GHZ, 5 GHz or 6 GHz. Each radio may alternatively serve one radio role of data transmission with one access point or serve another radio role for finding a new access point, completing a roaming, and performing data traffic switch.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
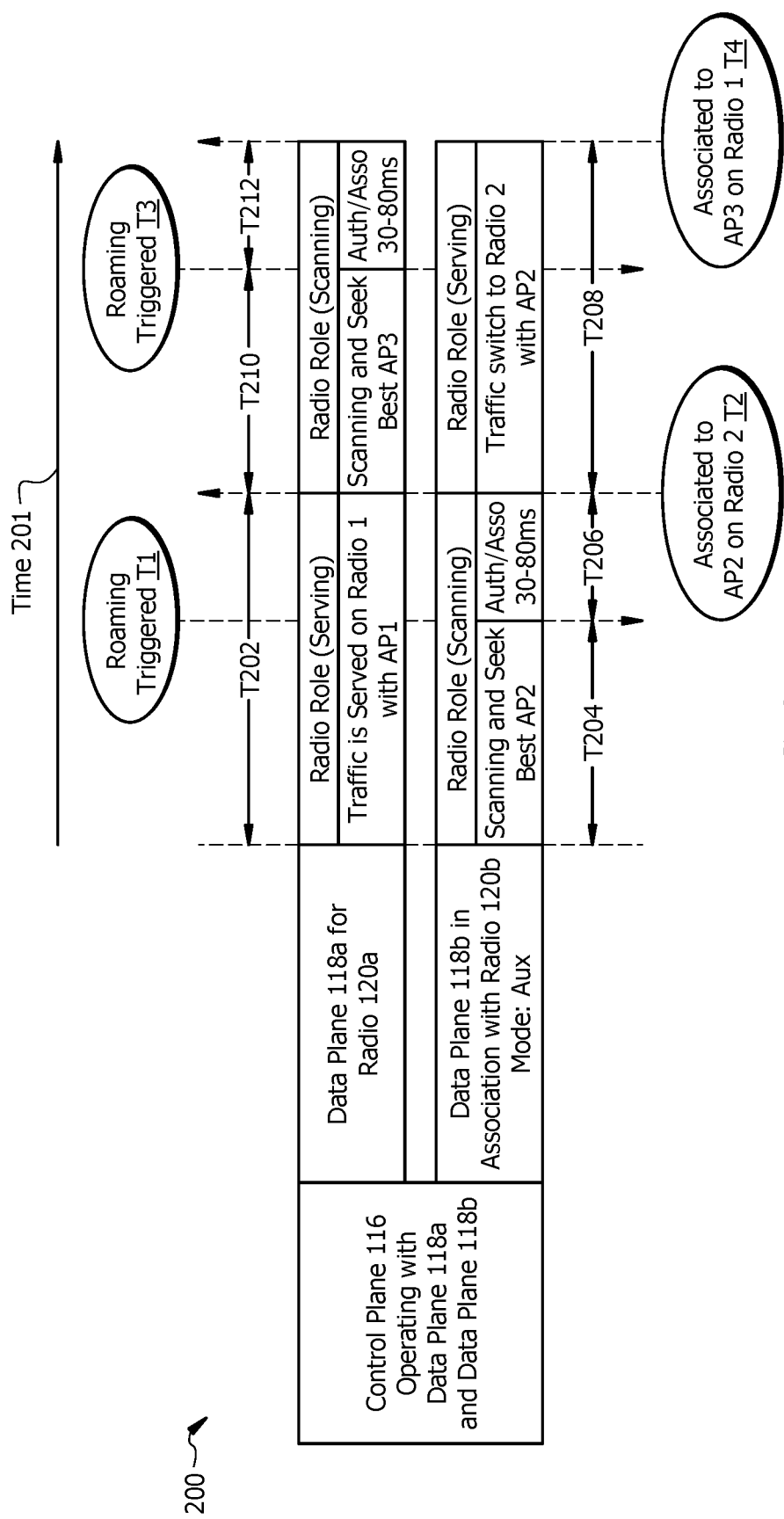
FIG. 2 illustrates network and traffic transmissions for achieving zero packet loss in wireless roaming, according to particular embodiments of the present disclosure.
Figure 3:
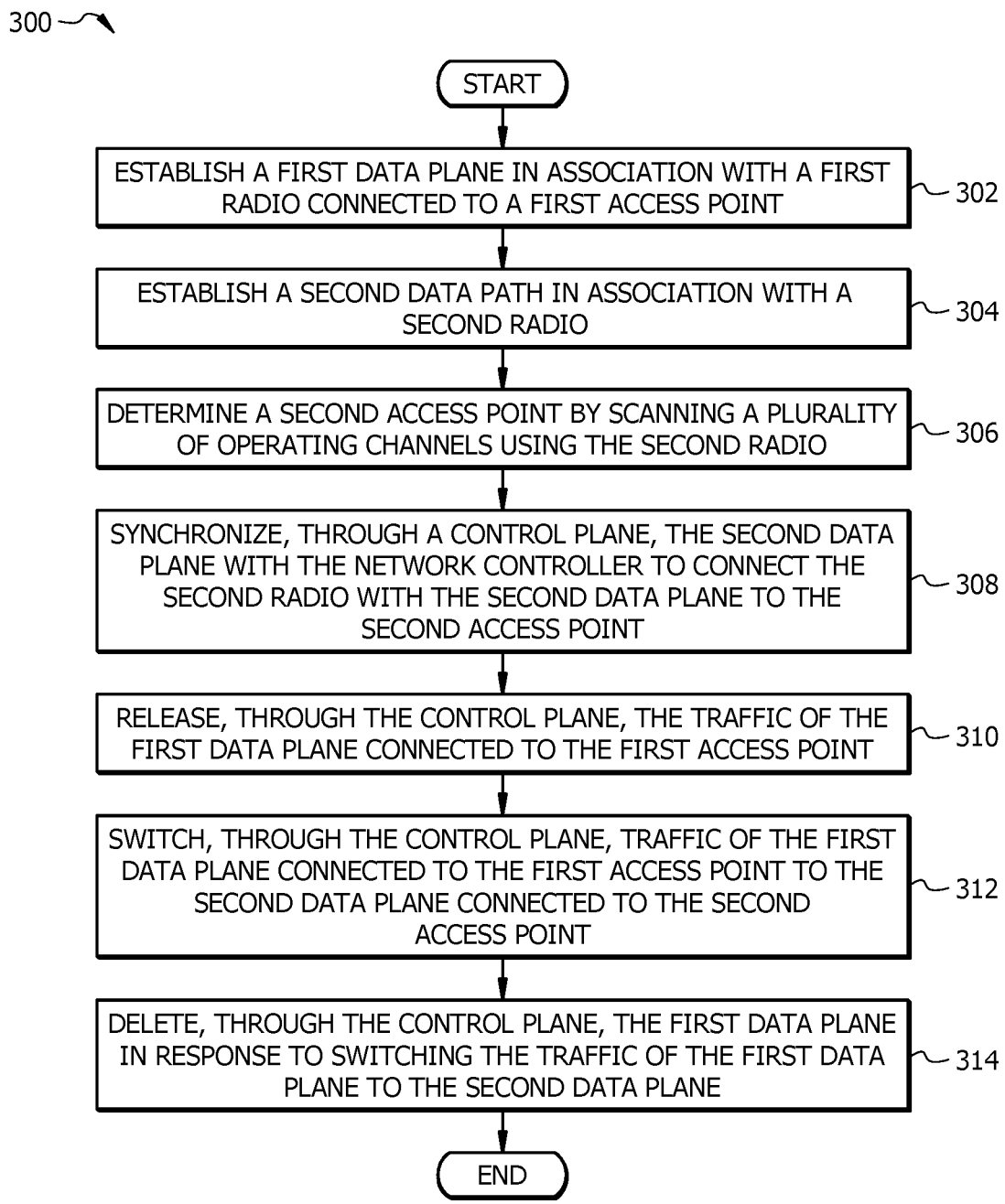
FIG. 3 illustrates an example method for achieving zero packet loss in wireless roaming, according to particular embodiments of the present disclosure.
Figure 4:
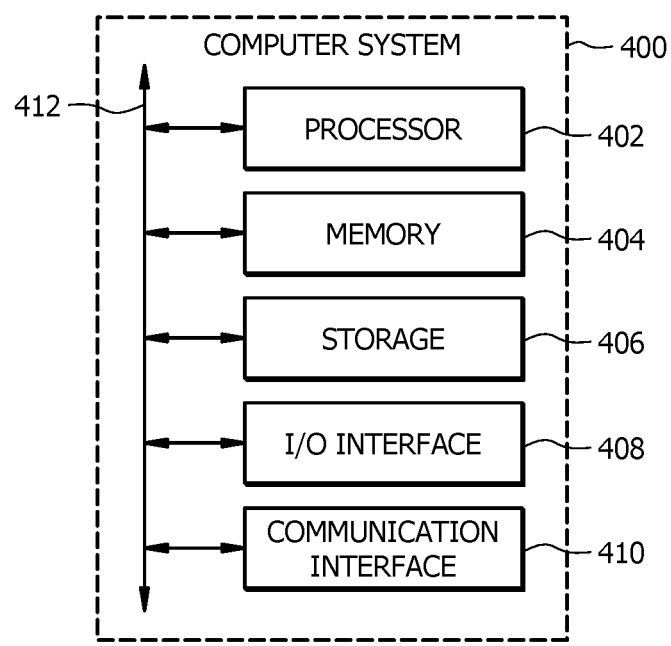
FIG. 4 illustrates an example computer system, according to particular embodiments of the present disclosure.

This disclosure provides systems and methods to achieve zero packet loss during wireless roaming in a communication network. In particular, this disclosure provides various systems and methods to prevent data packet losses and facilitate a wireless client device to perform wireless roaming from one access point to another access point. FIG. 1 illustrates a network system 100 that includes a wireless client device 110 in communication with a plurality of wireless access points (APs) and a network controller 150 to perform data transmission, wireless roaming, and data path switching. FIG. 2 illustrates networking and traffic transmissions 200 in which the wireless client device 110 may use a control plane 116 to operate with a first data plane 118a and a second data plane 118b to perform data transmission, wireless roaming, and data path switching. FIG. 3 illustrates a process 300 to perform networking and traffic transmissions 200 of FIG. 2. FIG. 4 illustrates an example computer system 400 which may be used by the systems and methods described herein.

FIG. 1 illustrates a network system 100 configured to perform one or more network operations in accordance with one or more embodiments. The network operations may include transmitting control commands, signaling messages, and data packages (e.g., traffic) among one or more wireless client devices 110, a plurality of access points (APs) (130a, 130b and 130c), a network controller 150, and a network 160. Each of the plurality of the APs includes any wireless communication device that may be installed at a geographical location and connected to the network 160 used to facilitate wireless communication and roaming control in the network system 100. The wireless client device 110 is in communication with a plurality of the APs through the network 160. The plurality of the APs may be managed by the network controller 150. In particular embodiments, an AP may operate as a workgroup bridge (e.g., WGB-AP) device that may provide wireless connectivity to a plurality of wireless client devices 110. The network controller 150 provides traffic control and network access to the plurality of the APs and the wireless client device 110. While the various embodiments described herein are described in relation to the first AP 130a and the second AP 130b, the methods and functions may also apply to three or more APs that are in communication with the network controller 150.

Particular embodiments of the networks in network system 100 may implement communication standards, such as Global System for Mobile Communications (GSM), Universal Mobile Telecommunications System (UMTS), Long Term Evolution (LTE), and/or other suitable 2G, 3G, 4G, or 5G standards; WiFi6/WiFi7 standards, wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

In particular embodiments, the network controller 150 stores information for each AP in communication with wireless client devices 110, stores a list of neighbor APs, and communicates the information to each AP through the network 160. The network controller 150 may also store association data between each AP and corresponding wireless client devices 110. Therefore, the network controller 150 and each AP have channel availability and data plane information. The network controller 150 may authorize the wireless client devices 110 to roam to an AP. In particular embodiments, each AP may provide control messages or signaling messages to the wireless client device 110 in addition to network access. For example, the first AP 130a is a first Wi-Fi access point. The second AP 130b is a second Wi-Fi access point.

The wireless client device 110 is generally any wireless device that communicates with one or more radio network nodes in a cellular or mobile communication system, such as mobile phones, computers, tablets, etc. The wireless client device 110 communicates with one or more APs via one or more of the plurality of radios, such as a first radio 120a and a second radio 120b. The wireless client device 110 includes a processor 112 in communication with a memory 114. The memory 114 may include a control plane 116, a first data plane 118a in association with a first radio 120a connected to the first AP 130a, and a second data plane 118b in association with a second radio 120b connected to the second AP 130b.

The control plane 116 may include a combination of control plane interfaces, control plane protocols, and network components. The control plane 116 may include software instructions that are executed by the processor 112 of the wireless client device 110 to implement control processes of data transmission, wireless roaming, and data path switch. As illustrated in FIG. 1, the control plane 116 may include software instructions stored in a memory 114 and executed by the processor 112 of the wireless client device 110. Control plane 116 may use control plane interfaces and control plane protocols to communicate with a network controller 150, a first AP 130a, and a second AP 130b to implement roaming. In particular embodiments, the control plane 116 may include functions and processes that are executed by the wireless client device 110 to manage a plurality of operations for implementing data transmission and a roaming from the first AP 130a to the second AP 130b. For example, the control plane 116 may be configured to be executed by the processor 112 to provide data transmission and roaming control. The roaming control may include detecting downlink (DL) signals from the first AP 130a, scanning operating channels to find the second AP 130b, processing signaling messages, performing message exchanges to complete the roaming, synchronizing the second data plane 118b associated with the second AP 130b with the network controller 150, switching traffic of the first data plane 118a associated with the first AP 130a to the second data plane 118b associated with the second AP 130b, etc.

The first data plane 118a and the second data plane 118b are separate data planes in association with different radios and APs. Each data plane may include corresponding network components with functions and processes that may be executed by the wireless client device 110 to implement data transmission of the wireless roaming. The functions and processes may include software instructions stored in the memory 114 and executed by the processor 112 of the wireless client device 110 to implement the data transmission of the wireless roaming. For example, the data transmission of the wireless roaming may include communicating data packets or frames from one data plane to another data plane based on control logic and operations of the control plane 116.

In an exemplary embodiment of operation, a wireless client device 110 may use a control plane 116 operating with the first radio 120a and the second radio 120b to control roaming and traffic transmission. The wireless client device 110 may communicate with the first AP 130a to transmit traffic using the first data plane 118a (e.g., a first data path) in association with a first radio 120a. When the wireless client device 110 determines a low value of a received signal strength indicator (RSSI) through the first radio 120a from the first AP 130a, the low RSSI may trigger the wireless client device 110 for a roaming from the first AP 130a. The wireless client device 110 may use a second radio 120b to scan the plurality of operating channels to find a second AP 130b. The second AP 130b may provide the best roaming and communication path for the wireless client device 110. The wireless client device 110 may communicate with the network controller 150 to perform an authentication and association process for roaming from the first AP 130a to the second AP 130b. The wireless client device 110 may synchronize the second data plane 118b with the network controller 150 through the control plane 116 to connect the second radio 120b with the second data plane 118b to the second AP 130b. After the second radio 120b with the second data plane 118b is connected to the second AP 130b, the wireless client device 110 may perform roaming from the first AP 130a to the second AP. After the roaming is completed, the wireless client device 110 is ready to receive traffic of the first data plane 118a using the second data plane 118b. The wireless client device 110 may switch traffic of the first data plane connected to the first AP 130a to the second data plane 118b connected to the second AP 130b through the control plane 116. The traffic of the first data plane 118a may not be interrupted in the roaming process. The wireless client device 110 may achieve zero packet loss when the wireless client device 110 roams from the first AP 130a to the second AP 130b.

FIG. 2 illustrates networking and traffic transmissions 200 for achieving zero packet loss in wireless roaming. The wireless client device 110 may implement the networking and traffic transmissions 200 using multiple radios, such as a first radio 120a and a second radio 120b. In some embodiments, as time 201 proceeds, the wireless client device 110 may perform a fast roaming from the first AP 130a to the second AP 130b and switch the traffic of the first data plane 118a in association with the first radio 120a to the second data plane 118b in association with the second radio 120b. As time 201 proceeds through the time window T202, a first radio 120a of the wireless client device 110 may be connected to a first AP 130a and operate in a serving mode. The wireless client device 110 may transmit traffic using a first data plane 118a in association with the first radio 120a. As time 201 proceeds through the time window T204, the second radio 120b of the wireless client device 110 may operate in a scanning mode. The wireless client device 110 may use the second radio 120b to scan a plurality of operating channels to obtain information of a list of neighbor APs, such as a second AP 130b. The wireless client device 110 may use the first radio 120a to detect at least a low received signal strength indicator from the first AP 130a. The low received signal strength indicator may trigger the wireless client device 110 for a roaming at the time stamp T1. The wireless client device 110 may determine that the second AP 130b provides the best roaming and communication path. During the time window T206, the wireless client device 110 may communicate with the second AP 130b and the network controller 150 to perform an authentication and association process for roaming from the first AP 130a to the second AP 130b. After the roaming from the first AP 130a to the second AP 130b is completed, the wireless client device 110 may switch the traffic of the first data plane 118a connected to the first AP 130a to the second data plane 118b connected to the second AP 130b during the time window T206 before a time stamp T2. For example, it may take 30-80 ms to perform the authentication and association process to complete roaming and data path switch through the time window T206.

As time 201 proceeds through the time window T208, the second radio 120b of the wireless client device 110 is connected to the second AP 130b and operates in a serving mode. The wireless client device 110 may transmit traffic through the second data plane 118b in association with the second radio 120b. As time 201 proceeds through the time window T210, the wireless client device 110 may use the first radio 120a to detect a second roaming trigger at a time stamp T3. The wireless client device 110 may perform another fast roaming from the second AP 130b to a third AP 130c and corresponding data path switch during the time window T212 before a time stamp T4. In this way, the first radio 120a and the second radio 120b may alternatively operate in a serving mode for data transmission or operate in a scanning mode to find a new AP for roaming. The wireless client device 110 may use a single control plane 116 to operate with different data planes 118a and 118b associated with the first radio 120a and the second radio 120b to find a new AP, complete a roaming, and perform data traffic switch.

FIG. 3 illustrates an example process 300 for achieving zero packet loss in wireless roaming in the network system 100 in accordance with one or more embodiments. The implementation of the roaming is described in more detail in relation to FIG. 3 by referring to FIG. 2. The process 300 may begin at operation 302, where the wireless client device 110 may establish a first data plane 118a in association with a first radio 120a connected to a first AP 130a. The first radio 120a may be associated with the first data plane 118a and operate in a serving mode for traffic transmission during the time window T202 as illustrated in FIG. 2. The wireless client device 110 may communicate with the first AP 130a via the first radio 120a to transmit traffic using the first data plane 118a (e.g., a first data path).

At operation 304, the wireless client device 110 may establish a second data plane 118b (e.g., a second data path) in association with a second radio 120b while the traffic of the first data plane 118a is serving on the first radio 120a. The first data plane 118a is different from the second data plane 118b and operates concurrently with the second data plane 118b. As time 201 proceeds through the time window T202 as illustrated in FIG. 2, the wireless client device 110 may detect a first roaming trigger at a time stamp T1. For example, the information of each access point may include radio signal strength values, network routing information, location information, etc. The wireless client device 110 may detect at least a first low received signal strength indicator from the first AP 130a through the first radio 120a. The first low signal strength indicator may indicate that the signal strength of the wireless signal received by the first radio 120a from the first AP 130a is below a threshold signal strength value which is required for continuous data transmission. The first low received signal strength indicator may trigger a first roaming at the time stamp T1 for the wireless client device 110 to roam from a first AP 130a connected to the first radio 120a to the second AP 130b connected to the second radio 120b. The first radio 120a and the second radio 120b of the wireless client device may share a media access control (MAC) address for implementing a data path ready synchronization mechanism.

At operation 306, the wireless client device 110 may determine a second AP 130b by scanning a plurality of operating channels in the network 160 using the second radio 120b. The wireless client device 110 may use the second radio 120b to scan the plurality of operating channels to find a second AP 130b which may provide the best roaming and communication path for the wireless client device 110.

For example, in response to detecting the first roaming trigger at the time stamp T1 from a first data plane 118a and finding the second AP 130b, the wireless client device 110 may communicate with the second AP 130b and the network controller 150 to perform an authentication and association process for a roaming from the first AP 130a to the second AP 130b. For example, the wireless client device 110 may communicate an authentication frame and an association frame to the network controller 150 through the second data plane 118b to request roaming from the first AP 130a to the second AP 130b. The authentication frame and the association frame may include configuration information of the wireless client device 110 for roaming from the first AP 130a to the second AP 130b and connecting the second radio 120b with the second data plane 118b to the second AP 130b. The configuration information of the wireless client device 110 may include a service set identifier (SSID), channel information, and data plane information associated with the first radio 120a and the second radio 120b, and information of the first AP 130a and information of the second AP 130b. The network controller 150 may be configured to communicate a first signaling message to the second AP 130b to request installing the configuration information of the wireless client device 110.

In particular embodiments, the second AP 130b may install the configuration information of the wireless client device 110 and send a second signaling message to the network controller 150. The second signaling message may indicate that the configuration information of the wireless client device 110 is installed on the second AP 130b. The system may implement a data path ready synchronization mechanism by connecting the second radio 120b with the second data plane 118b to the second AP 130b before performing the roaming from the first AP 130a to the second AP 130b. After the network controller 150 receives the second signaling message from the second AP 130b, the network controller 150 may generate an authorization message (e.g., a third signaling message) to authorize the wireless client device 110 to synchronize the second data plane 118b with the network controller 150 through the control plane 116 to connect the second radio 120b with the second data plane 118b to the second AP 130b. The wireless client device 110 may receive the authorization message from the network controller 150 through the control plane 116 for roaming from the first AP 130a to the second AP 130b.

At operation 308, in response to receiving the authorization message from the network controller 150, the wireless client device 110 may synchronize the second data plane 118b with the network controller 150 through the control plane 116 to connect the second radio 120b with the second data plane 118b to the second AP 130b. For example, during the time window T206 as illustrated in FIG. 2, the second data plane 118b in association with the second radio 120b may be connected to the second AP 130b. After the second radio 120b with the second data plane 118b is connected to the second AP 130b, the wireless client device 110 may perform roaming from the first AP 130a connected to the first radio 120a to the second AP 130b connected to the second radio 120b through the control plane 116. After the roaming from the first AP 130a to the second AP 130b is completed through the time window T206, the second data plane 118b is ready to receive traffic of the first data plane 118a. The traffic of the first data plane 118a through the time window T202 is not interrupted in the roaming process through the time window T206.

At operation 310, the wireless client device 110 may release the traffic of the first data plane 118a connected to the first AP 130a through the control plane 116 after the roaming is completed from the first AP 130a to the second AP 130b and the second radio 120b associated with the second data plane 118b is connected to second AP 130b.

At operation 312, the wireless client device 110 may switch the traffic of the first data plane 118a connected to the first AP 130a to the second data plane 118b connected to the second AP 130b through the control plane 116 during the time window T206. The wireless client device 110 may complete the roaming and data path switch through the time window T206 before a time stamp T2. By using a data path ready synchronization mechanism described at operations 306-308, the wireless client device 110 may switch the traffic of the first data plane 118a to the second data plane 118b only after the roaming from the first AP 130a to the second AP 130b is completed and the second data plane 118b is ready for receiving the traffic from the first data plane 118a. In this way, the traffic of the first data plane 118a may not be interrupted in the roaming through the time window T202. The disclosed system may achieve zero packet loss when the wireless client device 110 roams from the first AP 130a to the second AP 130b.

At operation 314, the wireless client device 110 may delete, through the control plane 116, the first data plane 118a in association with the first radio 120a connected to the first AP 130a after the traffic of the first data plane 118a is switched to the second data plane 118b in association with the second radio 120b connected to the second AP 130b. The first radio 120a may operate in a scanning mode to find a new AP for roaming. The wireless client device 110 may establish a new data plane (e.g., a third data plane 118c) in association with the first radio 120a.

In particular embodiments, the operations 306-314 may be performed repeatedly to implement another roaming from the second AP 130b to a third AP 130c. For example, as time 201 proceeds through the time window T208, the second radio 120b connected to the second AP 130b may operate in a serving mode. The wireless client device 110 may communicate with the second AP 130b to transmit the traffic using the second data plane 118b in association with the second radio 120b. Further, the wireless client device 110 may detect at least a second low received signal strength indicator from the second AP 130b through the second radio 120b to trigger a second roaming at the time stamp T3. The second low received signal strength indicator may indicate that the signal strength of the wireless signal received by the second radio 120b from the second AP 130b is below a threshold signal strength value which is required for continuous data transmission. In response to detecting the second roaming trigger at the time stamp T3 from the second data plane 118b, the wireless client device 110 may scan a plurality of operating channels in the network 160 using the first radio 120a and find the third AP 130c by the first radio 120a through the control plane 116. The wireless client device 110 may establish a third data plane 118c connected to the first radio 120a. The third data plane 118c is different from the second data plane 118b and operates concurrently with the second data plane 118b. The wireless client device 110 may communicate an authentication frame and an association frame to the network controller 150 through the second data plane 118b and request roaming from the second AP 130b to the third AP 130c during the time window T212. The data path ready synchronization mechanism may be implemented with the similar operations as described in operations 308-310 for completing the second roaming and the corresponding data path switch. For example, the control plane 116 may be implemented by the processor 112 to synchronize the third data plane 118c with the network controller 150 to connect the first radio 120a with the third data plane 118c to the third AP 130c to complete the second roaming. After the second roaming from the second AP 130b connected to the second radio 120b to the third AP 130c connected to the first radio 120a is completed through the control plane 116, the first radio 120a with the third data plane 118c is connected to the third AP 130c. The third data plane 118c associated with the first radio 120a is ready to receive the traffic of the second data plane 118b. The wireless client device 110 may switch the traffic of the second data plane 118b associated with the second radio 120b connected to the second AP 130b to the third data plane 118c associated with the first radio 120a connected to the third AP 130c through the time window T212 before the time stamp T4. The traffic of the second data plane 118b may not be interrupted when the wireless client device 110 performs roaming from the second AP 130b to the third AP 130c through the time window T208.

In particular embodiments, the wireless client device 110 may include multiple radios such as 2.4 GHz, 5 GHZ or 6 GHZ. Each radio of the wireless client device 110 may alternatively operate in a serving mode for data transmission through one data plane in association with one access point or operate in a scanning mode through another data plane to find a new access point, complete a roaming, and perform data traffic switch.

FIG. 4 illustrates an example computer system 400 which may be used by the systems and methods described herein. As an example, a computer system 400 may be used to implement a wireless client device 110, a plurality of APs (e.g., 130a and 130b), a network controller 150, or other component of a network system 100 shown in FIG. 1. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 may perform one or more steps of one or more methods described or illustrated herein or provide functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

In particular embodiments, a computer system 400 includes a processor 402, memory 404, storage 406, an input/output (I/O) interface 408, a communication interface 410, and a bus 412. Processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, a computer system 400 may load instructions from storage 406 or another source (such as, for example, another computers system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computers system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and other network devices or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a network controller; and
    a wireless client device in communication with the network controller, the wireless client device comprising a memory and a processor, the processor communicatively coupled to the memory and configured to:
        establish a first data plane in association with a first radio connected to a first access point;
        establish a second data plane in association with a second radio, wherein the first data plane is different from and operates concurrently with the second data plane;
        determine a second access point by scanning a plurality of operating channels using the second radio;
        synchronize, through a control plane, the second data plane with the network controller to connect the second radio with the second data plane to the second access point; and
        switch, through the control plane, traffic of the first data plane connected to the first access point to the second data plane connected to the second access point, wherein the control plane is configured to operate with the first radio and the second radio.

2. The system of claim 1, wherein the processor is further configured to:
    communicate, to the network controller, an authentication frame and an association frame through the second data plane to request roaming from the first access point to the second access point, wherein the network controller is configured to:
    communicate, through the control plane, a first signaling message to the second access point to request installing configuration information of the wireless client device; and
    receive, from the second access point, a second signaling message indicating that the configuration information of the wireless client device is installed.

3. The system of claim 2, wherein the processor is further configured to:
    receive, from the network controller through the control plane, a third signaling message indicating an authorization for the wireless client device to roam from the first access point to the second access point;
    release, through the control plane, the traffic of the first data plane connected to the first access point; and
    delete, through the control plane, the first data plane in response to switching the traffic of the first data plane connected to the first access point to the second data plane connected to the second access point.

4. The system of claim 2, wherein the configuration information of the wireless client device comprises a service set identifier (SSID), channel information associated with the first radio and the second radio, information of the first access point and information of the second access point.

5. The system of claim 1, wherein the first radio and the second radio of the wireless client device shares a media access control (MAC) address.

6. The system of claim 1, wherein the processor is further configured to:
    detect at least a first low received signal strength indicator from the first access point through the first radio to trigger a first roaming to the second access point; and
    detect at least a second low received signal strength indicator from the second access point through the second radio to trigger a second roaming the second to a third access point.

7. The system of claim 1, wherein the first access point is a first Wi-Fi access point, and the second access point is a second Wi-Fi access point.

8. A method, comprising:
    establishing a first data plane in association with a first radio connected to a first access point, wherein a wireless client device comprises the first radio and a second radio and is in communication with a network controller;
    establishing a second data plane in association with the second radio, wherein the first data plane is different from and operates concurrently with the second data plane;
    determining a second access point by scanning a plurality of operating channels using the second radio;
    synchronizing, through a control plane, the second data plane with a network controller to connect the second radio with the second data plane to the second access point; and switching, through the control plane, traffic of the first data plane connected to the first access point to the second data plane connected to the second access point, wherein the control plane is configured to operate with the first radio and the second radio.

9. The method of claim 8, further comprising:
communicating, to the network controller, an authentication frame and an association frame through the second data plane to request roaming from the first access point to the second access point, wherein the network controller is configured to:
    communicating, through the control plane, a first signaling message to the second access point to request installing configuration information of the wireless client device; and
    receiving, from the second access point, a second signaling message indicating that the configuration information of the wireless client device is installed.

10. The method of claim 9, further comprising:
receiving, from the network controller, a third signaling message indicating an authorization for the wireless client device to roam from the first access point to the second access point;
releasing, through the control plane, the traffic of the first data plane connected to the first access point; and
deleting, through the control plane, the first data plane in response to switching the traffic of the first data plane connected to the first access point to the second data plane connected to the second access point.

11. The method of claim 9, wherein the configuration information of the wireless client device comprises a service set identifier (SSID), channel information associated with the first radio and the second radio, information of the first access point and information of the second access point.

12. The method of claim 8, further comprising:
detecting at least a first low received signal strength indicator from the first access point through the first radio to trigger a first roaming to the second access point; and
detecting at least a second low received signal strength indicator from the second access point through the second radio to trigger a second roaming the second to a third access point.

13. The method of claim 8, wherein the first radio and the second radio of the wireless client device shares a media access control (MAC) address.

14. The method of claim 8, wherein the first access point is a first Wi-Fi access point, and the second access point is a second Wi-Fi access point.

15. A non-transitory computer-readable medium comprising instructions that are configured, when executed by a processor, to:
establish a first data plane in association with a first radio connected to a first access point, wherein a wireless client device comprises the first radio and a second radio and is in communication with a network controller;
establish a second data plane in association with a second radio, wherein the first data plane is different from and operates concurrently with the second data plane;
determine a second access point by scanning a plurality of operating channels using the second radio;
synchronize, through a control plane, the second data plane with the network controller to connect the second radio with the second data plane to the second access point; and
switch, through the control plane, traffic of the first data plane connected to the first access point to the second data plane connected to the second access point, wherein the control plane is configured to operate with the first radio and the second radio.

16. The non-transitory computer-readable medium of claim 15, wherein the instructions when executed by the processor further cause the processor to:
communicate, to the network controller, an authentication frame and an association frame through the second data plane to request roaming from the first access point to the second access point, wherein the network controller is configured to:
    communicate, through the control plane, a first signaling message to the second access point to request installing configuration information of the wireless client device; and
    receive, from the second access point, a second signaling message indicating that the configuration information of the wireless client device is installed.

17. The non-transitory computer-readable medium of claim 16, wherein the instructions when executed by the processor further cause the processor to:
receive, from the network controller through the control plane, a third signaling message indicating an authorization for the wireless client device to roam from the first access point to the second access point;
release, through the control plane, the traffic of the first data plane connected to the first access point; and
delete, through the control plane, the first data plane in response to switching the traffic of the first data plane connected to the first access point to the second data plane connected to the second access point.

18. The non-transitory computer-readable medium of claim 16, wherein the configuration information of the wireless client device comprises a service set identifier (SSID), channel information associated with the first radio and the second radio, information of the first access point and information of the second access point.

19. The non-transitory computer-readable medium of claim 15, wherein the instructions when executed by the processor further cause the processor to:
detect at least a first low received signal strength indicator from the first access point through the first radio to trigger a first roaming to the second access point; and
detect at least a second low received signal strength indicator from the second access point through the second radio to trigger a second roaming the second to a third access point.

20. The non-transitory computer-readable medium of claim 15, wherein the first radio and the second radio of the wireless client device shares a media access control (MAC) address; and wherein the first access point is a first Wi-Fi access point, and the second access point is a second Wi-Fi access point.

* * * * *